United States Patent [19]

Obidin et al.

[11] Patent Number: 4,608,004
[45] Date of Patent: Aug. 26, 1986

[54] POWER STEERING ASSEMBLY

[75] Inventors: Valery Y. Obidin; Olga A. Zueva, both of Moscow; Vladimir M. Inochkin, Volzhsk; Andrei V. Zhavoronkov; Leonid K. Voinich, both of Moscow; Jury V. Polushin, Volzhsk; Petr A. Zakhodyakin, Moskovskaya; Zinaida I. Rodionova, Moscow; Nikolai N. Judchits, Minsk; Vladimir V. Belyanin, Volzhsk; Andrei A. Yarkin; Vyacheslav N. Kalmykov, both of Moscow; Mikhail M. Ageechkin, Moskovskava; Sergei M. Arakelyants, Moscow, all of U.S.S.R.

[73] Assignee: Nauchno-Proizvodstvennoe Obiedinenie Stroitelnogo I Dorozhnogo Mashinostroenia, Moscow, U.S.S.R.

[21] Appl. No.: 794,978

[22] Filed: Nov. 6, 1985

Related U.S. Application Data

[63] Continuation of Ser. No. 558,462, Dec. 6, 1983, abandoned.

[51] Int. Cl.⁴ .................. F04C 2/00; F16K 31/44; F16D 31/02
[52] U.S. Cl. .................. 418/206; 137/625.69
[58] Field of Search .................. 418/61 B, 206; 137/625.69; 251/266; 60/384; 180/146, 147

[56] References Cited

U.S. PATENT DOCUMENTS

| | | | |
|---|---|---|---|
| 1,334,906 | 3/1920 | Keith | 418/110 |
| 2,968,316 | 1/1961 | Schultz | 137/625.69 |
| 3,340,853 | 9/1967 | Link | 418/61 B |
| 3,499,390 | 3/1970 | Prijatel | 418/206 |
| 3,500,756 | 3/1970 | Liebert | 418/61 B |
| 3,763,951 | 10/1973 | Kristot | 137/625.69 |

FOREIGN PATENT DOCUMENTS 2052265 3/1971 France .

Primary Examiner—Leonard E. Smith
Assistant Examiner—Jane E. Obee
Attorney, Agent, or Firm—Fleit, Jacobson, Cohn & Price

[57] ABSTRACT

A hydraulically-assisted power steering assembly comprises a housing of a fluid distributor having arranged therein a control valve the central bore of which receives a steering shaft, and a servohydraulic actuator; the steering shaft, servohydraulic actuator and control valve being kinematically linked for the control valve to be capable of axial displacement when the steering shaft is turned. The kinematical linkage includes a tubular sleeve disposed inside the central bore of the control valve to rotate raltive thereto and to be fixed thereto in the axial direction, one end of the sleeve being connected to the steering shaft by way of a screw transmission.

8 Claims, 14 Drawing Figures

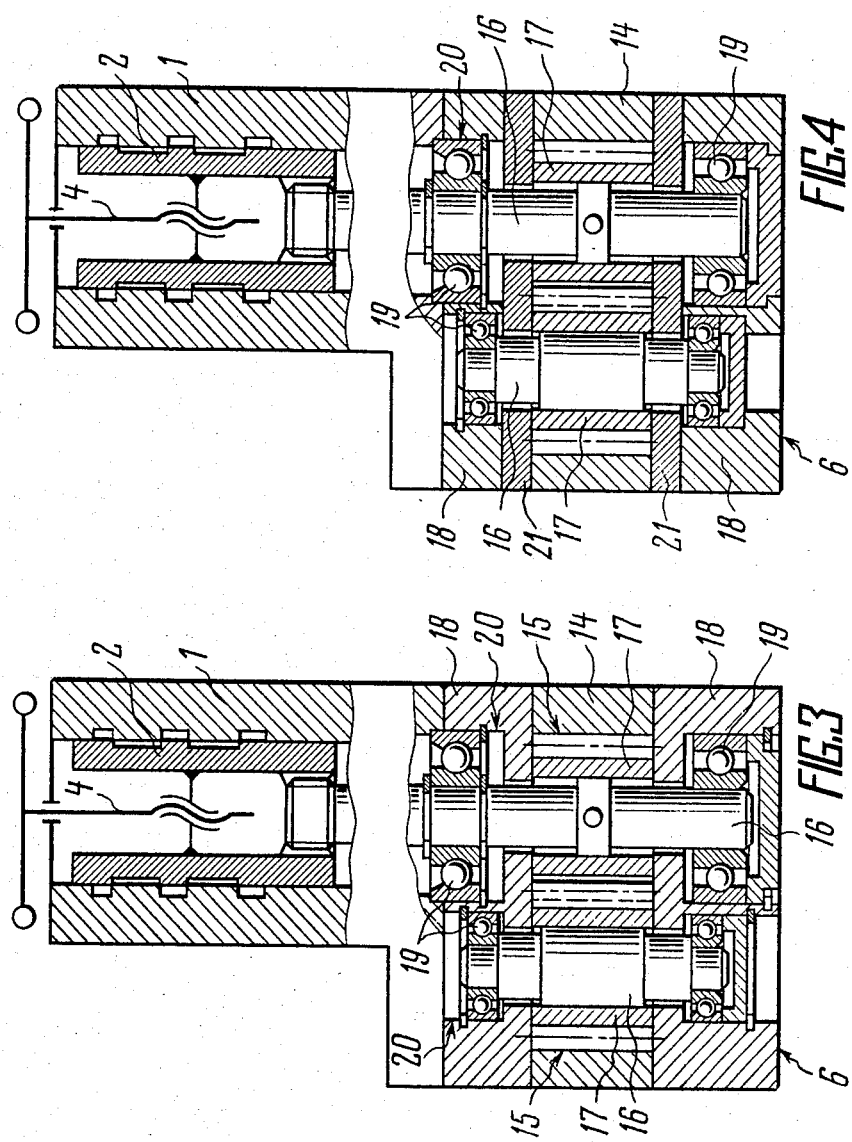

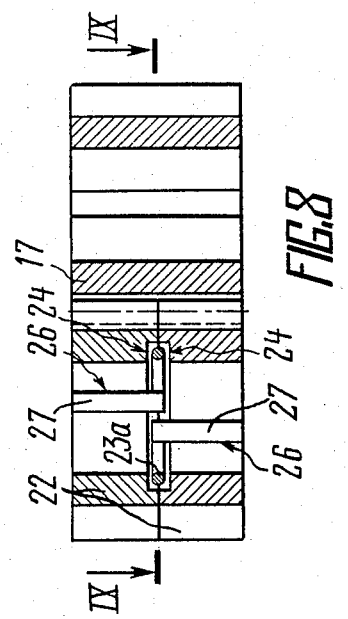
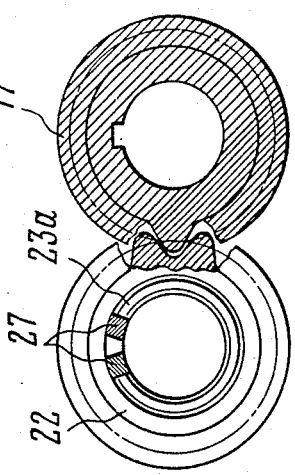
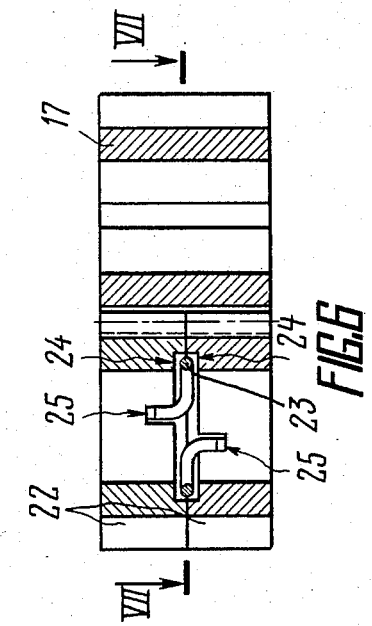
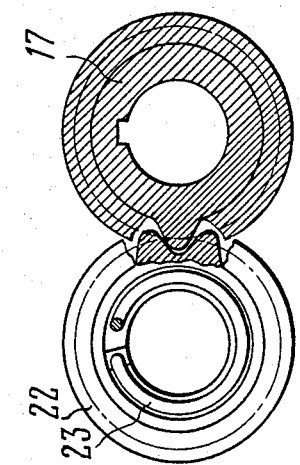

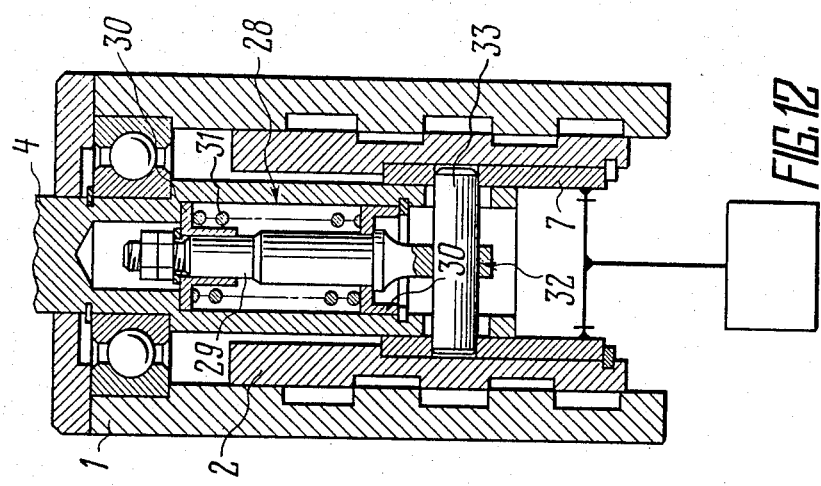
FIG. 12
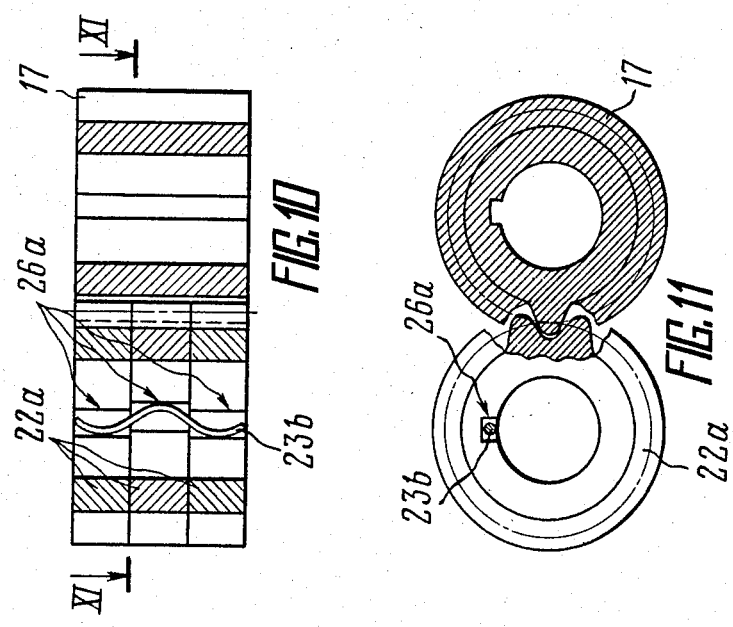
FIG. 10
FIG. 11

POWER STEERING ASSEMBLY

This application in a continuation of application Ser. No. 558,462, filed Dec. 6, 1983, now abandoned.

FIELD OF THE INVENTION

This invention relates to vehicle engineering. More particularly, the invention concerns hydraulically-operated power steering assemblies of vehicles.

INDUSTRIAL APPLICABILITY

The invention can find application in hydraulically-operated power steering systems of vehicles used predominantly in construction, road-building and agriculture, as well as in tractors, trucks and cars when turning the vehicle steerable wheels or collapsing the sections of hinged-frame vehicles is effected by a hydraulic power cylinder.

BACKGROUND OF THE INVENTION

At present, widely used in steering mechanisms of vehicles are hydraulically-operated power steering systems wherein a working fluid is distributed by a control valve kinematically linked with a servohydraulic actuator and a steering shaft so that during turning of the steering shaft a corresponding displacement and rotation of the control valve at an angle equal to the angle of turning of the steering shaft occurs.

However, the above construction is susceptible to fast wear and is not sufficiently reliable due to the rotation of the control valve, which affects the longevity of the steering mechanism.

One construction of power steering assembly makes use of a low speed planetary motor of the gerotor type as the servohydraulic actuator (cf., e.g., British Pat. No. 1,594,279; Cl. B 62 D 5/08, published 1981).

However, the above servohydraulic actuator is sensitive to reduced viscosity of the working fluid and impurities contained therein, which results in the loss of accuracy of the power steering assembly at increased temperature of the working fluid and a general decrease in reliability and durability.

The use of a conventional gear-type pump of external engagement makes it possible to considerably improve the characteristics of power steering.

The gear-type hydraulic pumps, however, have a number of disadvantages among which are noisy operation, increased starting torque and low efficiency at low speeds of rotation.

Kinematic linkage between the control valve of the fluid distributor and the hydraulic pump in the form of a spline shaft fails to take advantage of increased speed of rotation of the hydraulic pump, which would require less precision during the manufacture of such a pump and would result in higher efficiency.

There is also known a hydraulically-operated power steering assembly (cf. e.g., USSR Inventor's Certificate No. 770,900; Cl. B 62 D 5/06, published 1980) comprising a housing with a control valve of a fluid distributor, the central bore of the control valve accommodating a steering shaft with a screw transmission element provided thereon, and a servohydraulic actuator.

However, the power steering assembly of the above construction employs a costly plunger-type pump. Another disadvantage of the above power steering construction resides in that it lacks means for aligning the control valve.

There is further known a hydraulic power steering assembly (cf. French Pat. No. 2,052,265; Cl B 62 D 5/06, published 1971) comprising a housing of a fluid distributor with a control valve arranged inside the housing, a central bore of the control valve receiving a steering shaft provided with a screw transmission element, and a servohydraulic actuator. The steering shaft, servohydraulic actuator and the control valve are kinematically interconnected so that the control valve is capable of axial displacement when the steering shaft is turned.

During turning of the steering shaft the control valve is rotated in addition to being displaced axially, the angle of rotation of the control valve corresponding to the turning angle of the steering shaft when the vehicle wheels are steered or when the frame of a hinged-frame vehicle is collapsed to negotiate a road turn.

The aforedescribed movements of the control valve cause rather fast wear of the fluid distributor which consequently makes the power steering assembly less reliable.

In case of failure of the power assistance source, the driver applies to the steering shaft considerable torque. Because this torque is transmitted to the servohydraulic actuator through the control valve, the latter tends to deform whereby the fluid distributor may fail to result in reliable steering.

The provision of the low-speed servohydraulic pump or actuator affects proper operation of the power steering at high temperatures when the working fluid is less viscous or when this fluid contains impurities, which again affects steerability of the vehicle. In addition, high precision machining is required for fabricating low-speed servohydraulic actuators of the above construction.

One more disadvantage of the aforedescribed power steering assembly is that it employs means for aligning the control valve which is structurally complicated and difficult to assemble.

SUMMARY OF THE INVENTION

It is an object of this invention to improve the reliability and extend the service life of a hydraulic power steering assembly.

Another object is to increase the accuracy of operation of the hydraulic power steering assembly.

These objects are attained by that in a power steering assembly comprising a housing of a fluid distributor accommodating a control valve having a central bore receiving a steering shaft provided with a screw transmission element, and a servohydraulic actuator, the steering shaft, servohydraulic actuator and control valve being kinematically linked for the control valve to be capable of axial displacement when the steering shaft is turned, according to the invention, the above kinematic linkage includes a tubular sleeve provided with a receiving element of the screw transmission, the sleeve being arranged inside the central bore of the control valve to rotate relative thereto and to be fixed axially relative thereto, one end of the sleeve being connected to the steering shaft through the screw transmission.

The arrangement of the kinematic linkage in the form of the tubular sleeve makes it possible to dispense with rotational movement of the control valve to thereby obviate the transmission of torque thereto, which improves the reliability and extends the service life of the power steering assembly.

Preferably, the other end of the sleeve is connected through a spline shaft having outer splines on the two ends thereof to a satellite gear engageable with a crown gear secured in the housing of the fluid distributor, a central bore of the satellite gear having a bearing secured therein and journalled on an eccentric shaft connected to the servohydraulic actuator.

The above construction of the kinematic linkage provides for increased rotation of the servohydraulic actuator and geater efficiency of the power steering, which is especially pronounced at slow turning rates of the steering shaft. Concurrently, the mechanical efficiency is improved during the transmission of torque from the steering shaft to the shaft of the servohydraulic actuator, which is especially important when the power assistance source fails and the vehicle is to be steered by the manual effort of the driver.

Advisably, the servohydraulic actuator includes a housing with two through bores, the interior of the bores accommodating gears of external engagement secured on shafts, the housing being confined on the opposite sides by cover plates with bearings to journal the shafts of the gears, the cover plate adjacent the fluid distributor being provided with two through holes to receive the shafts of the gears of external engagement.

The arrangement of the servohydraulic actuator described above makes it possible to provide reliable hermeticity of the interiors thereof due to machining the bores of the housing and through holes of the cover plates in the sequence "housing-upper cover plate-lower cover plate". In consequence, the servohydraulic actuator can operate with working fluids of low viscosity.

Preferably, the servohydraulic actuator is provided with two wear plates interposed between the housing and the cover plates.

The provision of such wear plates simplifies the manufacture of the servohydraulic actuator and extends the service life and increases resistance to wear of the gears thereof thanks to the availability of a wide range of materials to be used for the gears and the wear plates mating therewith.

Alternatively, one of the gears of external engagement is a composite structure comprised of at least two gear sections the totalheight of which equals the height of the other gear, a spring being interposed between the gear sections to cooperate with these sections in order to offset one such section relative to the other one by the backlash in the engagement of the gear sections with the other gear.

The use of spring-loaded composite gears facilitates noiseless, smooth and reliable operation of the power steering assembly by virtue of obviating impacts in cooperation between the gears, especially when rotation of the servohydraulic actuator is reversed.

The above spring may be an annular or ring spring, with ends thereof crimped to the opposite sides in a plane substantially perpendicular to the plane of the spring whereas the end faces of the adjacent gear sections are provided with annular grooves and recesses in which this spring is placed.

The above spring-loading of the gears is simple to fabricate.

Advisably, the above spring is an annular spring, the end faces of the adjacent gear sections having annular grooves in which the spring is located, each of the gear sections being provided with a longitudinal slot extending to the annular groove and having a stop element therein.

Such construction of the spring is the simplest.

When the gear sections are no less than three in number, the inside surface of each of the three gear sections is provided with a longitudinal slot, the above spring being preferably a flat leaf spring with ends thereof crimped to be received in the slot so that the spring midpoint contacts the middle gear section.

The employment of such multiple gear sections increases the contact surface between the gears of the servohydraulic actuator to result in less noise, longer life and more accurate operation of the power steering assembly.

When the power steering assembly employs means for aligning the control valve, it is necessary that the body of the steering shaft be provided with a bore, this bore accommodating the control valve aligning means, the aligning means having the form of a rod with thrust washers capable of limited axial movement, a compression spring being interposed between the thrust washers, outer end faces of the thrust washers being adapted to cooperate with the steering shaft, a free end of the rod having a hole to couple with a pin arranged inside the sleeve.

The means for aligning the control valve described above is simple to fabricate and assemble. It ensures highly reliable operation due to the use of the compression spring.

BRIEF DESCRIPTION OF THE ACCOMPANYING DRAWINGS

The invention will now be described in greater detail with reference to various specific embodiments thereof taken in conjunction with the accompanying drawings, in which:

FIG. 3 shows construction of the servohydraulic actuator according to the invention;

FIG. 4 illustrates the manner in which wear plates are disposed between the housing of the servohydraulic actuator and the cover plates;

FIG. 6 shows composite gear sections with a spring element interposed therebetween;

FIG. 7 is a section taken on the line VII—VII in FIG. 6;

FIG. 8 shows an alternative attachment of the spring between the composite gear sections;

FIG. 9 is a section taken on the line IX—IX in FIG. 8;

FIG. 10 is another possible arrangement of the spring between the composite gear sections;

FIG. 11 is a section taken on the line XI—XI in FIG. 10;

FIG. 12 is a view of means for aligning the control valve; and

DETAILED DESCRIPTION OF THE INVENTION

Figure 1:
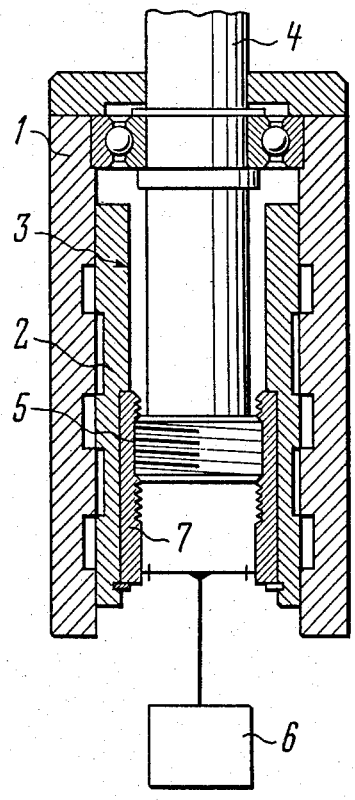
FIG. 1 shows the kinematic linkage between a steering shaft, servohydraulic a actuator and a control valve of a power steering assembly according to the invention.

A power steering assembly embodying the present invention comprises a housing 1 (FIG. 1) of a fluid distributor the central bore of which accommodates a control valve 2 of this fluid distributor. A steering shaft 4 with an element 5 of screw transmission is arranged inside a central bore 3 of the control valve 2. The power steering assembly also includes a servohydraulic actuator 6.

Figure 14:
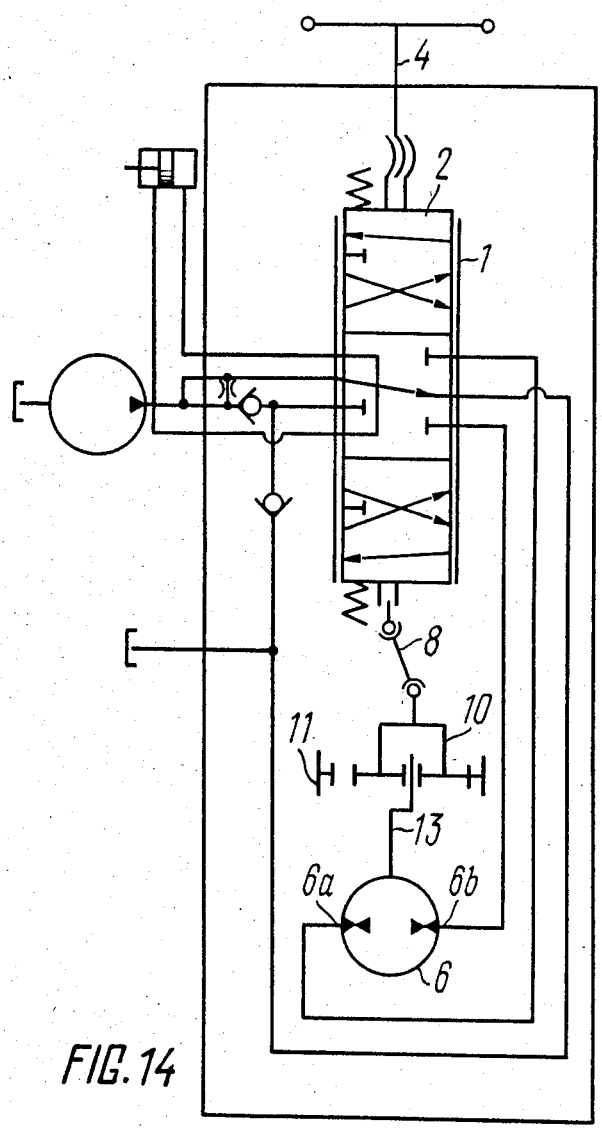
FIG. 14 is a schematic view of the hydraulic system of a power steering assembly in accordance with the present invention.

Normally, when the working fluid is delivered to the servohydraulic actuator 6 from a power-assistance feed source (not shown), this servohydraulic actuator 6 functions as a hydraulic motor. FIG. 14 shows inlet 6a and outlet 6b to the servohydraulic actuator 6. Each of the ports 6a and 6b functions alternately as an inlet or an outlet, depending upon the direction in which the servohydraulic actuator 6 is driven by hydraulic fluid furnished by the pump shown in the upper left-hand portion of FIG. 14. The flow direction of the pump is influenced by control valve 2.

When operating in an emergency (e.g., in case of failure of the power-assistance feed source), the servohydraulic actuator 6 operates as a hydraulic pump driven manually through the steering wheel of a vehicle by the driver.

The servohydraulic actuator 6, steering shaft 4 and control valve 2 of the fluid distributor are kinematically linked to provide for the axial movement of the control valve 2 when the steering shaft 4 is turned.

Figure 2:
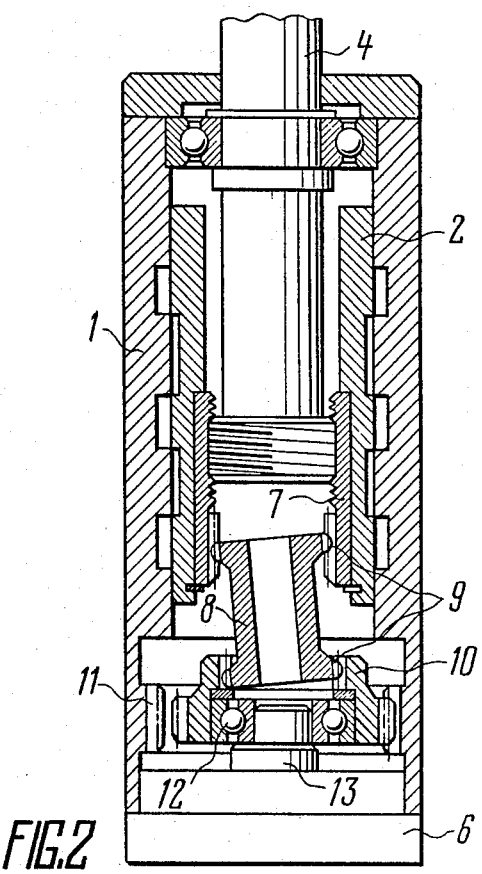
FIG. 2 illustrates the manner in which a tubular sleeve is connected to the servohydraulic actuator.

This kinematic linkage includes a tubular sleeve 7 having a receiving element of the screw transmission, the sleeve 7 being secured inside the central bore 3 of the control valve 2 to move tangentially and be stationary in the axial direction. One end of the sleeve 7 is connectable to the steering shaft 4 through the element 5 of the screw transmission and the receiving element of the screw transmission arranged on the inside surface thereof. Another end of the sleeve 7 (FIG. 2) is connected through a spline shaft 8 having 9 on the two ends thereof to a satellite gear 10 secured in the housing 1 of the fluid distributor. The central bore of the satellite gear 10 houses a bearing 12 journalled on an eccentric shaft 13 connected to the servohydraulic actuator 6.

The hereabove proposed kinematic linkage permits on increase in the rate of rotation of the servohydraulic actuator 6 and improve the volumetric efficiency of the power steering assembly at slow turning rates of the steering shaft 4.

Concurrently, this is accompanied by an increase in the mechanical efficiency when torque is transmitted from the steering shaft 4 to the shaft of the servohydraulic actuator 6, which is especially important when maintaining steering control in an emergency to initiate a rodd turn by the muscular effort of the driver.

The provision of the sleeve 7 enables elimination of rotation of the control valve 2 to thereby prevent a torque force from being exerted on the control valve 2, which results in a more reliable and lasting operation of the power steering assembly.

With reference to FIG. 3, the servohydraulic actuator 6 is generally fashioned as a housing 14 having two parallel through bores 15, the insides of the bores 15 accommodating gears 17 of external engagement on shafts 16. The opposite faces of the housing 14 are confined by upper and lower cover plates 18 with bearings 19 to journal the shafts 16 of the gears 17. The upper cover plate 18 facing the fluid distributor has two through holes 20 to receive the shafts 16 of the gears 17.

The aforedescribed construction of the servohydraulic actuator 6 facilitates the simultaneous drilling of the bores 15 in the housing 14 to accommodate the gears 17 and holes in the cover plates 18 to secure therein the bearings 19 of the shafts 16 by virtue of assembling these elements prior to machining the holes and bores in the following sequence: housing 14-upper cover plate 18-lower cover plate 18.

Precision machining of the holes and bores makes it possible to attain high hermeticity of the interior volumes of the servohydraulic actuator 6 for it to be capable to be operated by a low-viscosity working fluid.

Referring now to FIG. 4, wear plates 21 may be installed between the housing 14 of the sevohydraulic actuator 6 and the cover plates 18.

The provision of the wear plates 21 simplifies the fabrication of the servohydraulic actuator 6 to provide for a variety of materials to be selected for increasing the service life and wear resistance of the "gear 17/plate 21" mating pair.

Figure 5:
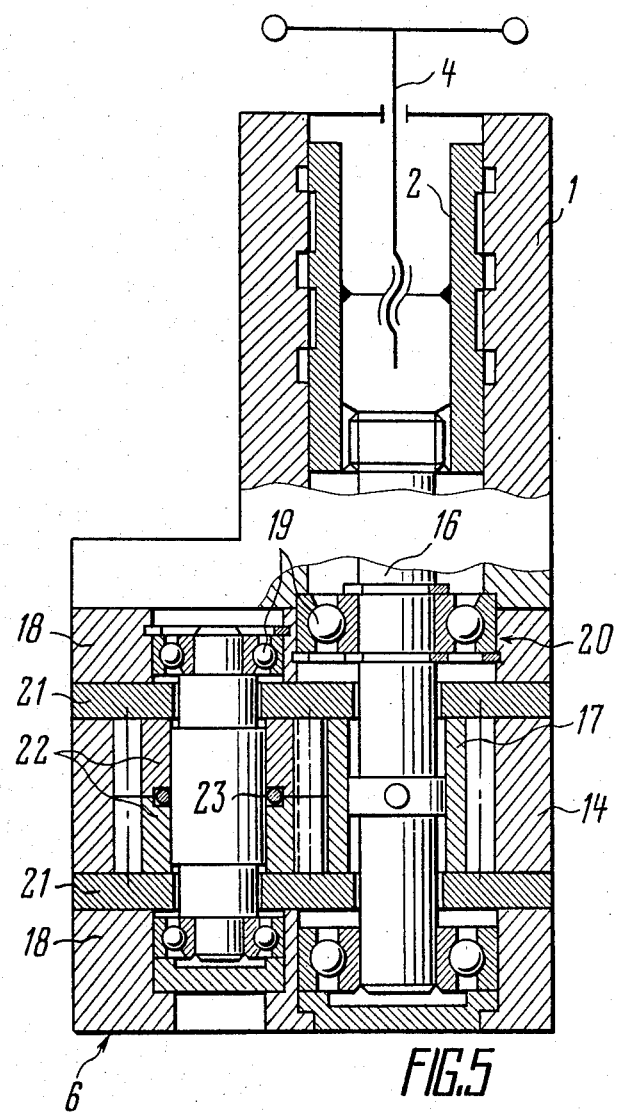
FIG. 5 is an alternative modification of the servohydraulic actuator with composite gears.

One of the gears 17 of external engagement (FIG. 5) may alternatively be of sectional construction to be therefore comprised of at least two gear sections 22 the total height of which equals the height of the other gear 17. Interposed between these gear sections 22 is a spring 23 adapted to engage with the two gear sections 22 to force-turn one such section relative to the other one by the backlash in the engagement of the gear sections 22 and gear 17.

The use of spring-loaded gear sections 22 ensures noiseless, smooth and durable operation of the power steering assembly through obviating impacts between the cooperating gears 17 and 22, especially when reversing the servohydraulic actuator 6.

Concurrently, thanks to the smooth rotation of the gears 17 and 22, a more accurate operation of the power steering assembly is attained, this improved accuracy being especially pronounced at slow turning rates of the steering shaft 4.

The spring 23 may have an annular shape as best seen in FIGS. 6 and 7 with ends thereof bent to the opposite sides in a plane substantially perpendicular to the plane of the spring 23. The adjoining end faces of the gear sections 22 have annular grooves 24 and recesses 25 to accommodate the spring 23.

The above arrangement of spring-loading is deemed most preferable, since difficulties associated with machining the gear sections 22 are minimized.

Alternatively, the spring 23 may take the form of an annular spring 23a as illustrated in FIGS. 8 and 9. In this case the end faces of the adjacent gear sections 22 are likewise provided with the annular grooves 24 wherein the annular spring 23a is placed, each of the gears 22 being further provided with a longitudinal slot 26 extending toward said annular groove 24 and having a stop element 27 therein.

The above arrangement of the spring 23a is the simplest, although it requires the provision of additional stops 27.

When gear sections 22a (FIGS. 10 and 11) are no less than three in number, the inside surface of each of the three gear sections 22a is preferably provided with a longitudinal slot 26a; the spring 23b is preferably a flat leaf spring with ends thereof bent to be received in the slot 26a so that the midportion of this sping contacts the middle gear section 22a.

The use of three or more gear sections 22a tends to increase the contact surface between the gears 22a and 17 of the servohydraulic actuator 6 to result in still less noise, extended service life and improved accuracy of operation of the power steering assembly.

Referring to FIG. 12, the power steering assembly according to the invention can be provided with means for aligning the control valve for which purpose a central bore 28 is made in the body of the steering shaft 4, this bore 28 accommodating the control valve aligning means having the form of a rod 29 with thrust washers 30 capable of limited axial displacement, a compression spring 31 being placed between the two thrust washers 30.

Outer end faces of the thrust washers 30 are adapted to cooperate with the steering shaft 4. A free end of the rod 29 has a hole 32 to couple with a pin 33 arranged inside the sleeve 7. The pin 33 of the control valve aligning machanism is arranged in the sleeve 7, and at a turn of the steering shaft 4 and displacement of the sleeve 7 together with the control valve 2, the pin is also displaced. Coupled with the pin 33 is the rod 29, cooperating with the spring-loaded thrust washers 30 in such a manner that at an axial displacement of the rod 29 in either direction, there occurs a displacement of one of the thrust washers 30 in relation to another stationary washer and, consequently, compression of the spring 31. When the steering shaft 4 is released, the sleeve 7 actuated by the force of the spring 31, tends to settle in the neutral position, also moving the control valve 2 in the neutral position.

The above described construction of the control valve alignment means ensures high reliability of operation thanks to the employment of the compression spring 31. The control valve aligning means is structurally simple to find employment in the power steering assembly.

Figure 13:
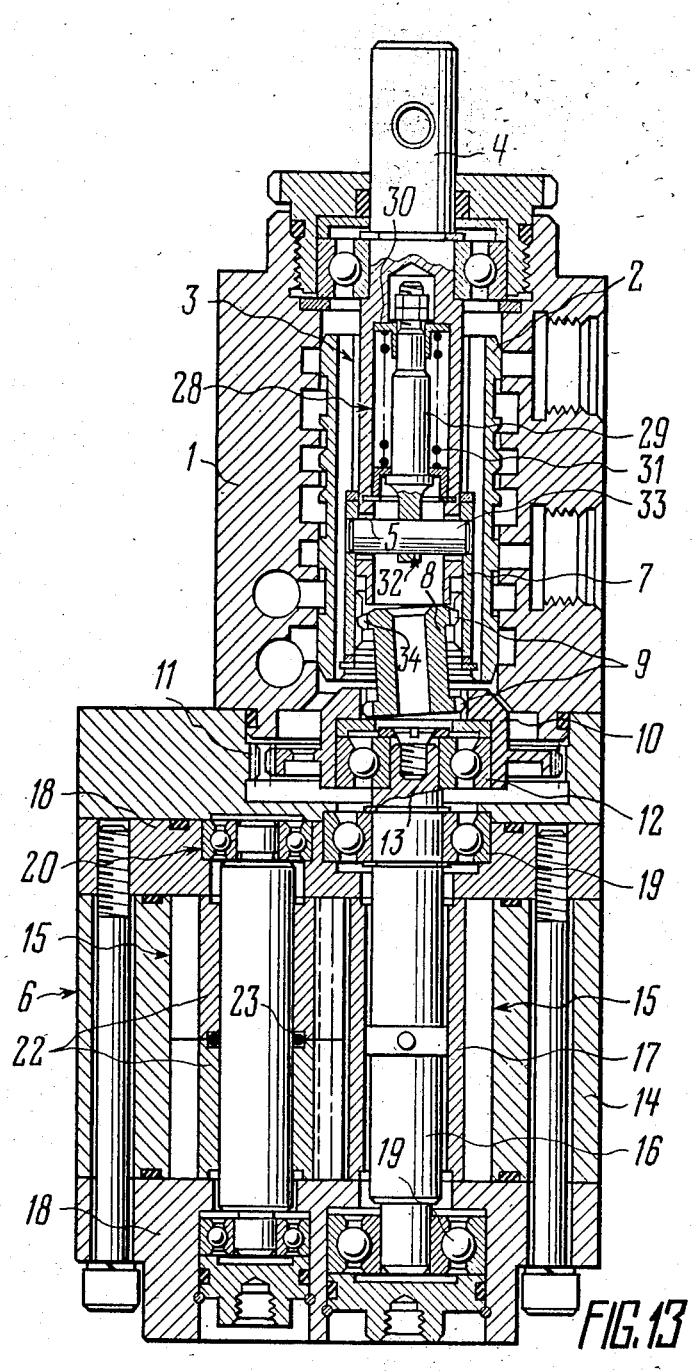
FIG. 13 is a general sectional view of the power steering assembly embodying the present invention.

The power steering assembly according to one possible embodiment thereof represented in FIG. 13 operates as follows.

When the steering shaft 4 is turned, the sleeve 7 is moved axially, under the action of the pin 33 positioned in the threads of the steering shaft 4, along splines 34. The movement of the sleeve 7 results in axial displacement of the control valve 2 of the fluid distributor essentially in the same direction to provide for the delivery of the working fluid from a pressure line of a fluid pump (not shown) to a power cylinder. The gears 17 and 22 of the servohydraulic actuator 6 are revolved to rotate the eccentric shaft 13 thereof. The satellite gear 10 tends to run about the crown gear 11 translating a planetary motion to the end of the spline shaft 8 accommodated inside the splined bore of the satellite gear 10. The opposite end of the spline shaft 8 receives a rotary motion at a speed which is less than the rotational speed of the eccentric shaft 13 by a value of the transmission ratio of the "satellite gear 10—crown gear 11" gearing. Because the spline shaft 8 is connected by the splines 34 with the splined end of the sleeve 7, the latter is caused to rotate at a speed equal to the speed of rotation of the steering shaft 4 which prevents a further axial displacement of the sleeve 7 and, consequently, of the control valve 2 of the fluid distributor. At a constant rate of turning of the steering shaft 4 the entire kinematic linkage is rotated uniformly to provide for a constant delivery rate of the working fluid to the power cylinder of the vehicle. When the rotation of the steering shaft 4 is terminated, the shaft 13 of the servohydraulic actuator 6 continues to rotate by virtue of the kinematic linkage "eccentric shaft 13—satellite gear 10—crown gear 11—spline shaft 8—sleeve 7—element 5 of the screw transmission" to move the control valve 2 axially in a direction opposite to the initial one until the delivery of the working fluid is terminated. Therewith, the turning of steerable wheels or sections of a hinged-frame vehicle is stopped. The proposed construction of the sleeve 7 and kinematic linkage between the steering shaft 4, control valve 2 and servohydraulic actuator 6 affords an improvement of the reliability and an extension of the life of the power steering assembly by virtue of providing exclusively longitudinal movement to the control valve 2 and preventing torsional forces from being exerted on the control valve. Such a construction also permits a considerable increase in the volumetric efficiency of the power steering assembly to facilitate its operation at low rates of turning of the steering shaft.

The aforedescribed advantages also result in improved mechanical efficiency of the power steering assembly when torque is transmitted from the steering shaft 4 to the shaft 13 of the servohydraulic actuator 6, which is especially important when the power assistance source fails.

The movement of the sleeve 7 relative to the steering shaft 4 causes displacement of the rod 29 of the control valve alignment means connected to the sleeve 7 by the pin 33 and compression of the spring 31 by forcing one of the thrust washers 30 to travel a certain distance axially of the rod 29.

When the driver's manual force applied to the steering wheel and consequently to the steering shaft 4 is released, the spring 31 acts to move the above elements in a reverse sequence to return the control valve 2 to the neutral position.

The proposed control valve aligning means is very reliable, simple to fabricate and easy to assemble.

The construction of the valve aligning means provides for the use of a very powerful compression spring 31 capable of ensuring the return of the control valve 2 to the neutral position to fix the steering shaft 4 for straight-ahead travel.

The employment of the spring-loaded composite gears 22 in the servohydraulic actuator 6 results in that these gear sections 22 under the action of the spring 23 tend to offset by their teeth relative to the teeth of the mating gear 17 by the backlash in the gear engagement to ensure smooth operation of the servohydraulic actuator 6.

The alternative construction of the gear-type servohydraulic actuator 6 employing a larger number of the gear sections 22, provides for better gear engagement contact between the gears 17 and 22 resulting in still further improved durability and reliability of the servohydraulic actuator 6.

Such use of the multiple gears 22 does not affect the volumetric efficiency of the actuator 6, because pressure differentials involved and consequently leaks between the working chambers of this actuator 6 are quite negligible.

The amount of pressure differential is determined exclusively by resistance to the displacement of the movable elements of the power steering assembly.

In case of failure of the power-assistance feed source, the working fluid can be delivered to the power cylinder of the vehicle steering system by the muscular effort of the driver. In such a case torque from the steering shaft 4 is transmitted through the kinematic linkage described above to the servohydraulic actuator 6 which in turn is caused to function as a manually operated hydraulic pump. The spring 23 is designed to a force corresponding to a small pressure differential between the inlets of the servohydraulic actuator 6 under normal operating conditions. This pressure is therefore not capable of returning the gear sections 22 to the initial position whereby backlash between gear teeth is taken up continuously during normal operation of the power steering assembly. When operated manually, torque exerted on the eccentric shaft 13 of the servohydraulic actuator 6 and, as a consequence, pressure differential are considerably increased. The spring 23 is therefore not capable of overcoming the load exerted whereby the gear sections 22 are offset relative to each other to the initial position to function as a single unit gear providing for a highly reliable mesh, which is very important in emergencies.

What is claimed is:

1. A power steering assembly comprising: a housing of a fluid distributor having an inside bore portion; a control valve of said fluid distributor disposed inside said bore portion of said housing for axial movement therewithin without rotation, said control valve having a central bore; a steering shaft having a threaded end provided thereon, said threaded end of said steering shaft positioned within said central bore of said control valve; a servohydraulic actuator including a satellite gear and a crown gear, said satellite gear engaged with said crown gear for planetary movement relative thereto, said satellite gear including a central bore having a bearing secured therein; a spline shaft having outer splines on the two ends thereof, one end of said spline shaft drivingly engaged with said satellite gear of said servohydraulic actuator; said steering shaft, servohydraulic actuator and control valve being kinematically interconnected for said control valve to be capable of axial displacement within said housing without rotation when said steering shaft is turned; said kinematic linkage including a sleeve having a thread engageable with said threaded end of said steering shaft, said sleeve being accommodated inside said central bore of said control valve for rotation relative thereto and being fixed relative thereto in the axial direction, one end of said sleeve being connected to said steering shaft by way of said thread and the other end of said sleeve being drivingly engaged with the other end of said spline shaft; and an eccentric shaft journalled in said bearing of said satellite gear and connected to said servohydraulic actuator.

2. A power steering assembly as defined in claim 1 including means for aligning said control valve, said steering shaft having a central bore formed in the body thereof, said bore accommodating said control valve aligning means, the aligning means including a rod with thrust washers capable of limited axial displacement and a compression spring interposed between the thrust washers, outer end faces of the thrust washers being adapted to cooperatively engage with said steering shaft, a free end of said rod having a hole to couple with a pin arranged inside said sleeve.

3. A power steering assembly as defined in claim 1 wherein said servohydraulic actuator includes a housing with two through bores, the inside of these bores accommodating gears of external engagement secured on shafts, said housing of said servohydraulic actuator being confined on opposite ends by cover plates provided with bearings to journal said shafts of said gears of external engagement, said cover plate adjoining said fluid distributor being provided with two through holes to receive said shafts of said gears of external engagement.

4. A power steering assembly as defined in claim 3 wherein said servohydraulic actuator is provided with a wear plate interposed between said housing of the servohydraulic actuator and each of said cover plates thereof.

5. A power steering assembly as defined in claim 3 wherein one of said gears of external engagement is a composite gear comprised of at least two gear sections the total height of which equals the height of said other gear, a spring being interposed between said gear sections to cooperate with said two gear sections to offset one said section relative to the other one by the backlash in the engagement of said gear sections.

6. A power steering assembly as defined in claim 5 wherein said spring is an annular spring with ends thereof bent to the opposite sides in a plane substantially perpendicular to the plane of said spring, the end faces of said adjacent gear sections having annular grooves and recesses to accommodate said spring.

7. A power steering assembly as defined in claim 5 wherein said spring is an annular spring, the end face of said adjacent gear sections having annular grooves in which said spring is placed, each of said gear sections being provided with a longitudinal slot extending to said annular groove and having a stop element therein.

8. A power steering assembly as defined in claim 5 wherein said gear sections are no less than three in number and the inside surface of each of said gear sections is provided with a longitudinal slot, said spring being preferably a flat leaf spring with ends thereof bent to be received in said slot so that its midpoint contacts said middle gear section.

* * * * *